(12) United States Patent
Obata

(10) Patent No.: US 9,312,560 B2
(45) Date of Patent: Apr. 12, 2016

(54) SECONDARY BATTERY ASSEMBLY

(75) Inventor: Hiroyuki Obata, Nagoya (JP)

(73) Assignee: Toyota Jidosha Kabushiki Kaisha, Toyota-Shi, Aichi (JP)

( * ) Notice: Subject to any disclaimer, the term of this patent is extended or adjusted under 35 U.S.C. 154(b) by 0 days.

(21) Appl. No.: 14/343,518

(22) PCT Filed: Dec. 27, 2011

(86) PCT No.: PCT/JP2011/080212
§ 371 (c)(1),
(2), (4) Date: Mar. 7, 2014

(87) PCT Pub. No.: WO2013/098939
PCT Pub. Date: Jul. 4, 2013

(65) Prior Publication Data
US 2014/0308556 A1    Oct. 16, 2014

(51) Int. Cl.
*H01M 10/04* (2006.01)
*H01M 2/10* (2006.01)
*H01M 6/46* (2006.01)
*H01M 2/02* (2006.01)
*H01M 10/625* (2014.01)
*H01M 10/647* (2014.01)
*H01M 10/6557* (2014.01)
*H01M 10/6561* (2014.01)
*H01M 10/613* (2014.01)

(52) U.S. Cl.
CPC ........ *H01M 10/0431* (2013.01); *H01M 2/1072* (2013.01); *H01M 2/1077* (2013.01); *H01M 6/46* (2013.01); *H01M 10/0481* (2013.01); *H01M 2/0237* (2013.01); *H01M 10/613* (2015.04); *H01M 10/625* (2015.04); *H01M 10/647* (2015.04); *H01M 10/6557* (2015.04); *H01M 10/6561* (2015.04); *H01M 2220/20* (2013.01)

(58) Field of Classification Search
None
See application file for complete search history.

(56) References Cited

U.S. PATENT DOCUMENTS

2005/0202311 A1    9/2005   Higashino et al.
2006/0202661 A1    9/2006   Kim et al.
(Continued)

FOREIGN PATENT DOCUMENTS

JP    2002-245992    8/2002
JP    2003-323874    11/2003
(Continued)

OTHER PUBLICATIONS

Machine translation of Hagiwara JP 2009259455 obtained from JPO website.*

*Primary Examiner* — Sarah A Slifka
(74) *Attorney, Agent, or Firm* — Finnegan, Henderson, Farabow, Garrett & Dunner LLP

(57) ABSTRACT

A secondary battery assembly includes: a secondary battery including a wound electrode body enclosed in a flat rectangular case; a contact member partly contacting a side surface as a pressed surface having a maximum area of outer surfaces of the secondary battery; and a binding member for binding the secondary battery and the contact member to partly press against the pressed surface. The contact member includes: contact parts arranged discretely in contact with the pressed surface; and a connecting part connecting the contact parts. The contact parts are formed to protrude from the connecting part toward the pressed surface, and into an arrangement or a shape to press more weakly both one-side regions of the pressed surface in a winding axis direction and more strongly a central region between the one-side regions.

11 Claims, 10 Drawing Sheets

(56) References Cited

U.S. PATENT DOCUMENTS

| | | | |
|---|---|---|---|
| 2007/0141452 A1* | 6/2007 | Kim | ............................ 429/120 |
| 2009/0111010 A1 | 4/2009 | Okada et al. | |
| 2013/0078491 A1 | 3/2013 | Obata | |

FOREIGN PATENT DOCUMENTS

| | | |
|---|---|---|
| JP | 2005-259500 | 9/2005 |
| JP | 2006-253144 | 9/2006 |
| JP | 2009-48965 | 3/2009 |
| JP | 2009-110833 | 5/2009 |
| JP | 2009259455 | * 11/2009 |
| JP | 2010-97693 | 4/2010 |
| KR | 10-0684861 | 2/2007 |
| WO | WO 2011/158341 | 12/2011 |

* cited by examiner

SECONDARY BATTERY ASSEMBLY

CROSS-REFERENCE TO RELATED APPLICATIONS

This application is a national phase application of International Application No. PCT/JP2011/080212, filed Dec. 27, 2011, the content of which is incorporated herein by reference.

TECHNICAL FIELD

The present invention relates to a secondary battery assembly including a secondary battery containing a wound electrode body in a rectangular flat case. More particularly, the present invention relates to a secondary battery assembly in which secondary batteries are bound so that a side surface having a maximum area (hereinafter, referred to as a pressed surface) of outer surfaces of each secondary battery is partly pressed.

BACKGROUND ART

There is a secondary battery configured in such a manner that positive and negative electrode plates are wound or laminated with a separator interposed therebetween and they are enclosed together with an electrolyte solution in an outer case. It is known that gas occurs in such a secondary battery due to repeated charge and discharge, causing variations in internal pressure, deformation of the outer case, and others. This deformation is undesired because they cause rapid deterioration of the secondary battery. For avoiding such deformation, a flat-shaped secondary battery is particularly arranged such that binding plates or the like are placed in contact with pressed surfaces of an outer case, pressing against the pressed surfaces, to prevent deformation of the case. Further, also used is a battery pack in which a plurality of secondary batteries are arranged and externally entirely bound with binding plates.

For instance, Patent Document 1 discloses a battery pack in which flat type secondary batteries stacked one on another are entirely sandwiched between binding plates and tightened with a belt. It is disclosed that this configuration can bear down active materials applied to electrode plates, thereby preventing separation of the active materials from the electrode plates. Another battery pack is disclosed (see Patent Document 2, for example) in which binding plates are placed one each between stacked secondary batteries and connected to each other to give surface pressure on each secondary battery. Any battery packs mentioned above are adapted to maintain the planarity of a side surface of the secondary battery to uniformize the surface pressure.

RELATED ART DOCUMENTS

Patent Documents

Patent Document 1: JP-A-2003-323874
Patent Document 2: JP-A-2005-259500

SUMMARY OF INVENTION

Problems to be Solved by the Invention

However, many of secondary batteries to be mounted in a vehicle or the like are used by repeating charge and discharge with large currents (referred to as high rate). Relating to a secondary battery including a wound electrode body, it has been found that there is a case where the surface pressure gets higher in portions close to both ends in a winding axis direction than in a central portion according to the type of battery or according to the way to use. Accordingly, when such a binding method as to keep the flat shape of the outer case is selected as in the aforementioned conventional battery pack, the central portion of the surface is subjected to lower surface pressure than the portions located on both sides thereof. In other words, this binding method could not always provide uniform surface pressure. In the case where the secondary batteries to be used at the high rate are bound to keep respective flat shape, a problem occurs that the surface pressure cannot be maintained uniform.

The present invention has been made to solve the above problems of the conventional technique and has a purpose to provide a secondary battery assembly capable of maintaining uniform surface pressure of a secondary battery to be used at a high rate and restraining deterioration of the secondary battery from progressing.

Means of Solving the Problems

To achieve the above purpose, one aspect of the invention provides a secondary battery assembly including: a secondary battery including a wound electrode body enclosed in a flat rectangular case; a contact member partly contacting a side surface of the secondary battery, the side surface having a maximum area (hereinafter, referred to as "pressed surface") of outer surfaces of the secondary battery; and a binding member for binding the secondary battery and the contact member, the binding member being configured to bind the contact member to partly press against the pressed surface, wherein the contact member includes: a plurality of contact parts arranged discretely, each contact part being in contact with the pressed surface; and a connecting part connecting the plurality of contact parts to one another, the contact parts are formed to protrude from the connecting part toward the pressed surface, and into an arrangement or a shape to press more weakly both one-side regions of the pressed surface corresponding to portions off a center of the wound electrode body in a winding axis direction, and to press more strongly a central region of the pressed surface between the one-side regions, the central region corresponding to a portion close to the center of the wound electrode body in the winding axis direction.

According to the secondary battery assembly in the above aspect, the pressed surface of the secondary battery is partly pressed by the contact member. The contact member is configured such that the plurality of contact parts discretely provided are connected by the connecting part. Accordingly, the position of each contact part contacting with the secondary battery is a previously determined position. Further, the position of each contact part and the protruding height thereof are appropriately set in advance, so that the pressing strength to the pressed surface at each position can be set. Herein, the shape or position of the contact part is selected so that the pressing force to the pressed surface is lower in correspondence to each one-side region than in correspondence to the central region. Thus, the internal pressure of the secondary battery can be made uniform. Even the secondary battery to be used at a high rate can keep the surface pressure uniform, thereby enabling preventing the deterioration of the secondary battery from progressing.

In the above aspect of the invention, preferably, a protruding height of the contact parts in correspondence to the one-side regions is lower than a protruding height of the contact parts in correspondence to the central region. The above configuration can provide a weaker pressing force to the pressed surface in correspondence to each one-side region than in correspondence to the central region.

In the above aspect of the invention, it may be arranged such that an area occupying ratio of the contact parts in correspondence to the one-side regions is smaller than an area occupying ratio of the contact parts in correspondence to the central region. Such a configuration also can provide a weaker pressing force to the pressed surface in correspondence to each one-side region than in correspondence to the central region.

In the above aspect of the invention, preferably, the contact parts include a contact part formed to extend continuously over the one-side regions located on both sides in the winding axis direction of the wound electrode body. The above shape is suitable for the secondary battery assembly arranged to make cooling air flow in the winding axis direction.

In the above aspect of the invention, preferably, the contact parts further include contact parts formed corresponding to only the central region close to the center without being formed corresponding to the one-side regions located on both sides of the central region. Alternatively, in the above aspect of the invention, it may be arranged such that the contact parts include a contact part formed such that a thickness in a direction perpendicular to the winding axis direction of the wound electrode body is thinner in correspondence to the one-side regions than in correspondence to the central region.

In the above aspect of the invention, preferably, the contact parts include a contact part formed to be long in a direction perpendicular to the winding axis direction of the wound electrode body. Such a shape also can get adjusted pressing force to the pressed surface. In particular, it is suitable to make cooling air flow in the direct perpendicular to the winding axis direction.

In the above aspect of the invention, preferably, the contact part located corresponding to each one-side region is formed to be shorter than the contact part located corresponding to the central region. Alternatively, in the above aspect of the invention, it may be arranged such that the contact parts located corresponding to the one-side regions are arranged at wider intervals than the contact parts located corresponding to the central region.

In the above aspect of the invention, preferably, the contact parts include a contact part protruding in a columnar shape. Such a shape can provide the secondary battery assembly with adjusted pressing force to each pressed surface.

In the above aspect of the invention, preferably, a contact area of each of the contact parts to the pressed surface is smaller in correspondence to the one-side regions than in correspondence to the central region. Alternatively, in the above aspect of the invention, it may be arranged such that the contact parts located corresponding to the one-side regions are arranged at wider intervals than the contact parts located corresponding to the central region.

Effects of the Invention

According to the secondary battery assembly in the above configurations, the surface pressure of the secondary battery to be used at a high rate can be kept uniform, thereby restraining the deterioration of the secondary battery from progressing.

MODE FOR CARRYING OUT THE INVENTION

A detailed description of a preferred embodiment of the present invention will now be given referring to the accompanying drawings. This embodiment embodies the invention as a battery pack in which a plurality of lithium ion secondary batteries are stacked one on another and connected to each other.

Figure 1:
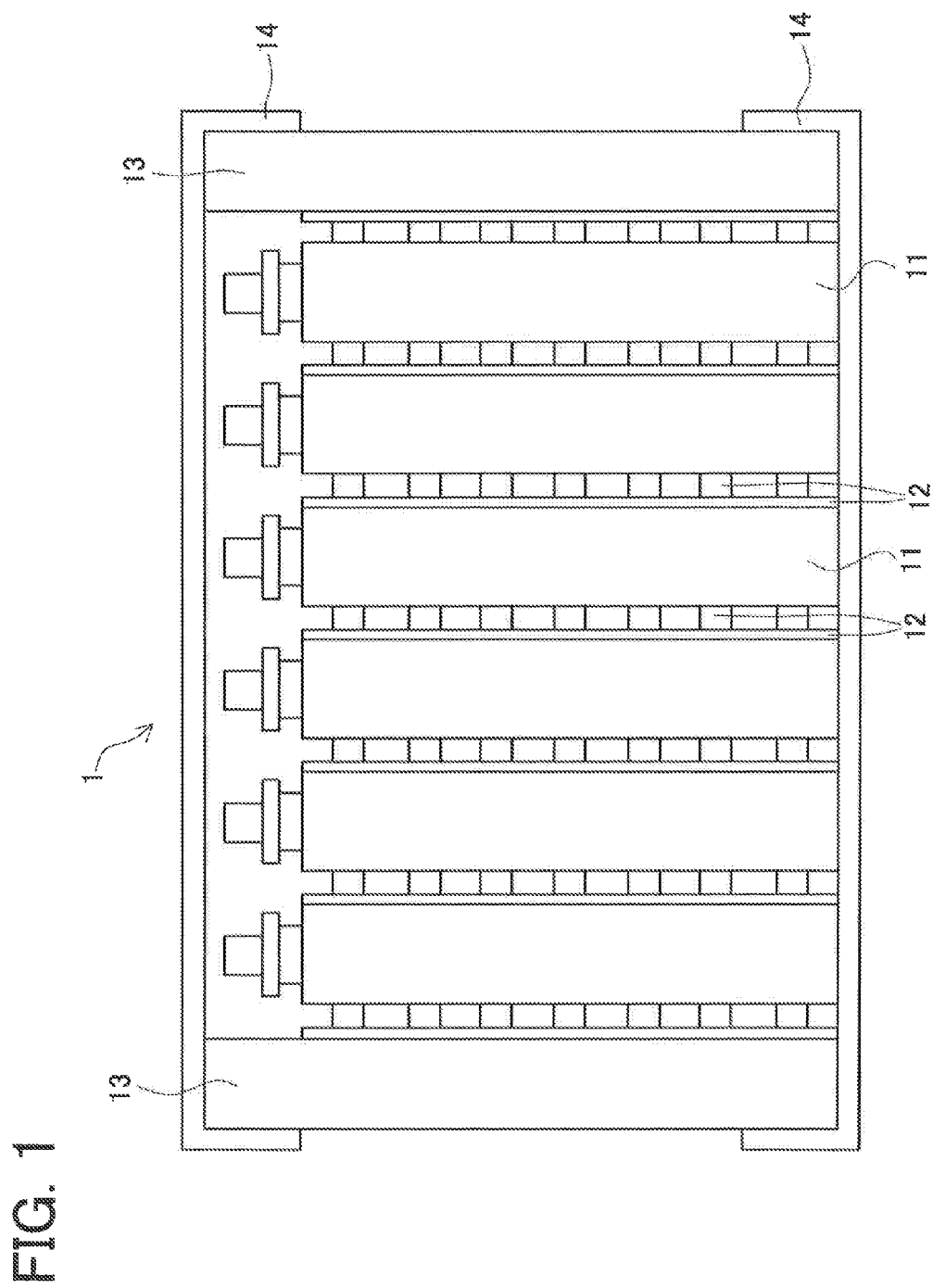
FIG. 1 is a side view of a battery pack in an embodiment.

A battery pack 1 in this embodiment includes a plurality of cells 11, a plurality of contact members 12, and two binding members, as shown in FIG. 1. The cells 11 and the contact members 12 are alternately placed in a stacking manner. The binding members 13 are placed on both sides of the whole assembly. The binding members 13 on both sides are locked to each other in such a manner that both ends of each binding band 14 are fixed to the binding members 13. Thus, the cells 11 and others located between them are pressed from both sides by the binding members 13. In this embodiment, this battery pack 1 corresponds to a secondary battery assembly.

Figure 2:
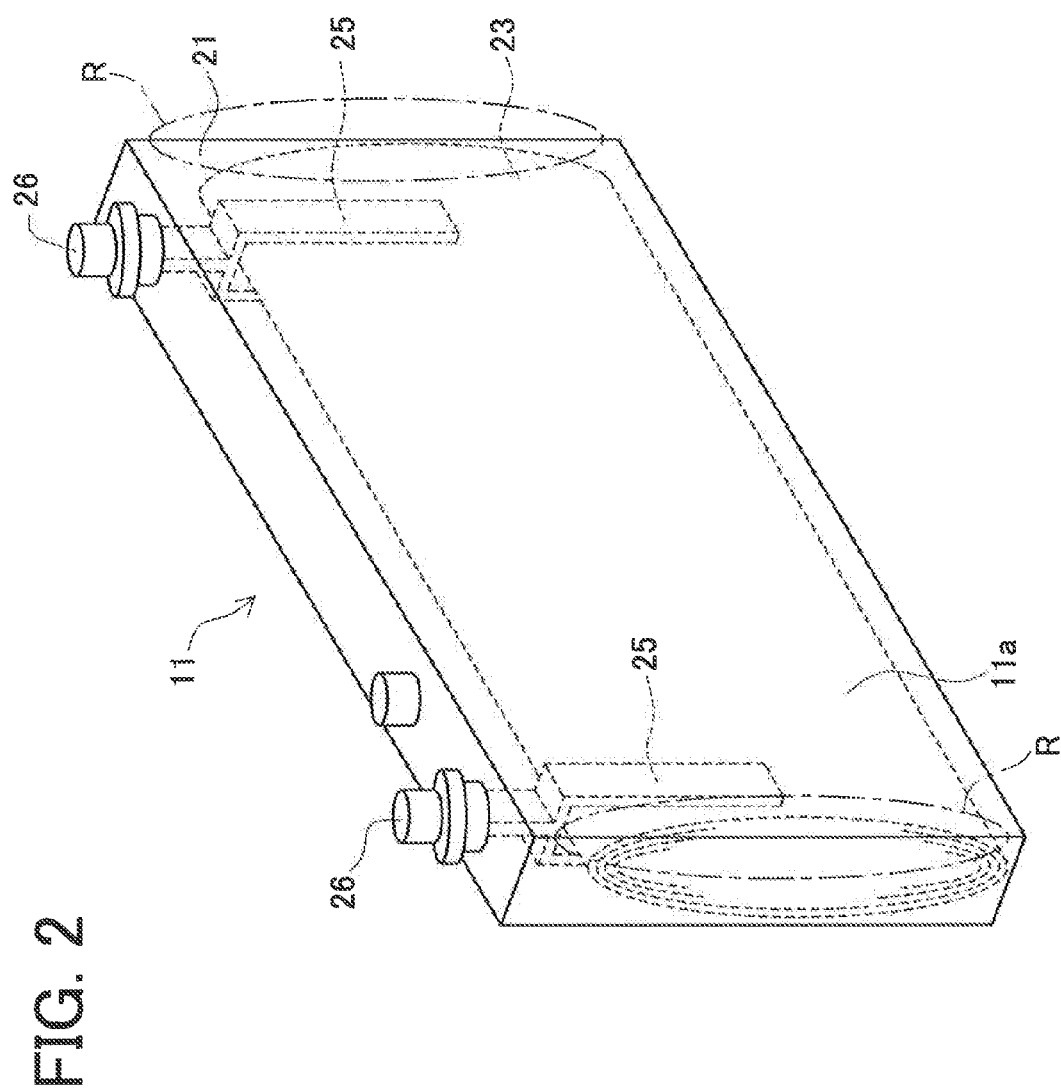
FIG. 2 is an explanatory view showing the inside of a cell in the embodiment.

Each cell 11 in this embodiment is a wound type lithium on secondary battery in which a wound electrode body 23 is enclosed with an electrolyte in a rectangular flat case 21 as shown in FIG. 2. The electrode body 23 in this embodiment is of a flat shape deformed in a perpendicular direction to a winding axis. The electrode body 23 is connected, at both ends of the winding axis, to positive and negative electrode terminals 25 respectively. The electrode terminals 25 are connected individually to external terminals 26 each protruding from an upper surface of the case 21 in the figure. Of the cell 11, a right front surface and its back surface corresponding to a left rear surface in the figure are pressed surfaces 11a having a larger area than other surfaces.

Figure 3:
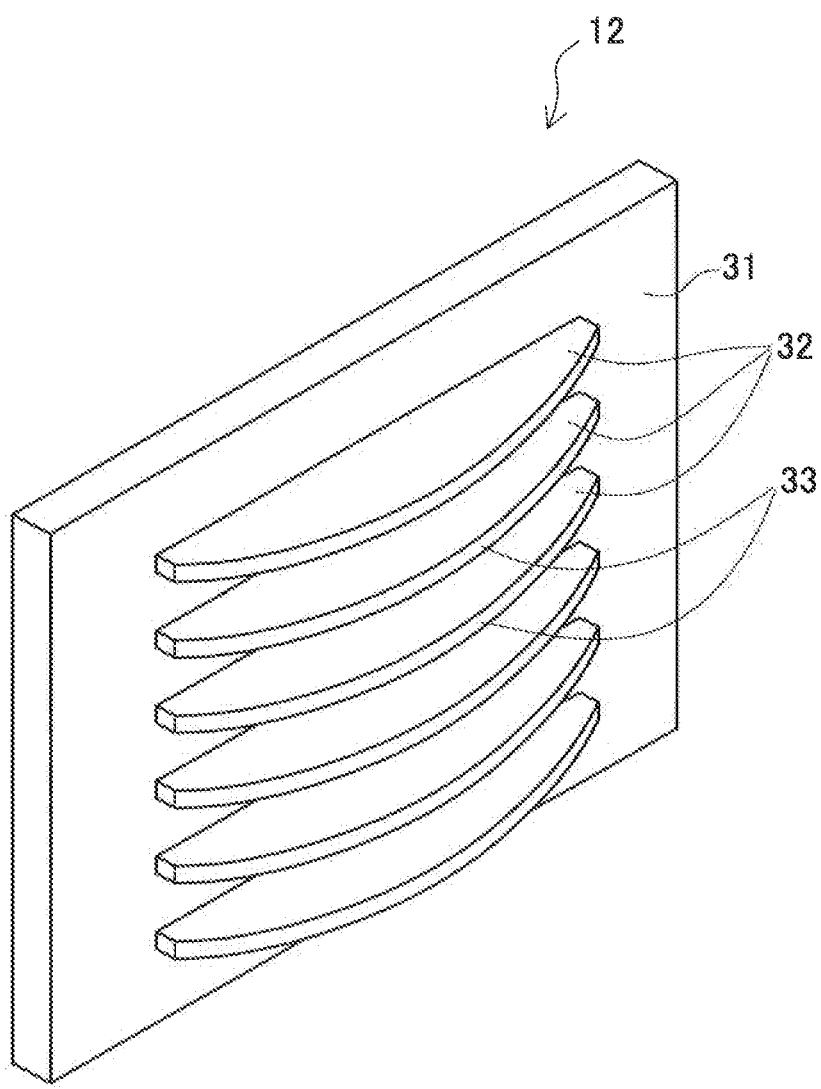
FIG. 3 is a perspective view of a contact member.

The contact members 12 in this embodiment are placed between the cells 11 as shown in FIG. 1 and also located between the cell 11 and the binding member 13. Each contact member 12 has a plate-like connecting part 31 and comb-teeth parts 32 formed to protrude right forward from the connecting part 31 in the figure as shown in FIG. 3. In this embodiment, the comb-teeth parts 32 are formed on only one surface of the connecting part 31 and in parallel with each other. Each comb-teeth part 32 of the contact member 12 in this embodiment has a top face 33 having a gentle curve as shown in FIG. 3. In other words, when this contact member 12 is viewed from above in FIG. 3, the top face 33 of the comb-teeth part 32 is curved to be concave at the center thereof a shown in FIG. 4.

In the battery pack 1 in this embodiment, the contact members 12 are placed so that the comb-teeth parts 32 are parallel with the winding axis of the electrode body 23 of the cells 11. In other words, the contact members 12 each oriented as shown in FIG. 3 are held one between the cells 11 each oriented as shown in FIG. 2. As a result, the top face 33 of each comb-teeth part 32 of the contact member 12 contacts with the pressed surface 11a of the cell 11. Each comb-teeth part 32 having the curved top face 33 as mentioned above is not uniform in protruding height, in the battery pack 1, therefore, pressing force of the contact member 12 to the pressed surface 11a is different according to portions of that surface.

Figure 4:
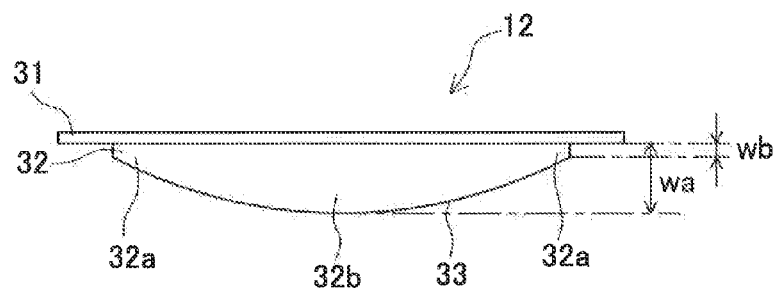
FIG. 4 is a side view showing a comb-teeth shape of the contact member.

To be concrete, the contact member 12 is designed such that a central portion 32b has a higher protruding height 'wa' from the connecting part 31 than a protruding width 'wb' of one-side portions 32a located on both sides as shown in FIG. 4. In the battery pack 1 of the present embodiment, therefore, the central portion 32b of the contact member 12 presses the pressed surface 11a more strongly than the one-side portions 32a do. Accordingly, the pressed surface 11a of each cell 11 receives a larger pressing force in a central region 42 (see FIG. 5) corresponding to a portion close to the center in the winding axis direction than in one-side regions 41 corresponding to portions off the center. It is found that this pressing manner can uniformize the surface pressure on the cell 11.

Figure 5:
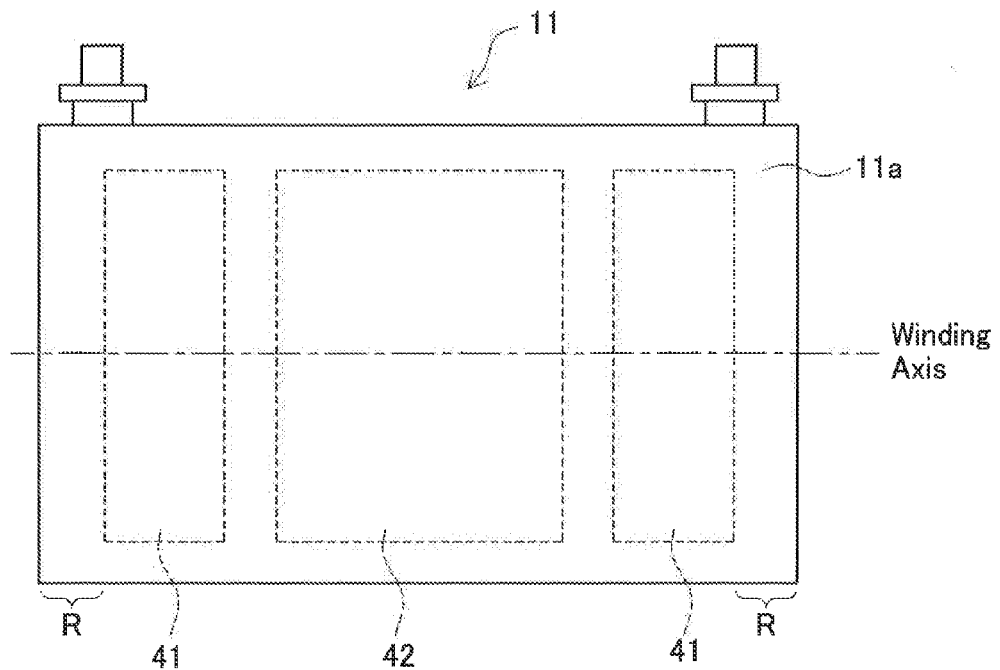
FIG. 5 is an explanatory view showing a distribution of pressing pressure to a cell.

In FIG. 5, the central region 42 and each one-side region 41 are illustrated as being spaced at intervals from each other. However, it is not always necessary to provide such spacing in setting the central region 42 and the one-side regions 41. These central region 42 and one-side regions 41 may be set to be adjoining with each other. Further, the right and left one-side regions 41 in the figure are not always required to be equal in area size and shape and in magnitude of the pressing force.

On the other hand, a slight clearance exists between each one-side region 41 and the outer periphery of the pressed surface 11a. This results from that the case 21 in this embodiment is a metal container having an almost rectangular parallelepiped shape. In other words, a metal plate is bent at an almost right angle to form an end portion R (see FIG. 2) at an intersection of surfaces of the case 21. Each end portion R of the case 21 is remarkably high in rigidity and does not need to be pressed by the contact member 12. In the present embodiment, therefore, the position of each component is determined so that the comb-teeth parts 32 do not contact with the end portions R. As shown in FIG. 5, the end portions R are located close to both ends in the winding axis direction than the one-side region 41 is. The end portions R are not included in the one-side regions 41.

The connecting part 31 of the contact member 12 has a size almost equal to the pressed surface 11a. The connecting part 31 is formed, on its surface, with the comb-teeth parts 32 in a range corresponding to a range including the one-side regions 41 on both sides and the central region 42 but not including the end portions R. For instance, as shown in FIG. 3, this range is the inside excepting a portion near the outer periphery of the connecting part 31. In using the battery pack 1, it is preferable to make cooling air flow in a direction parallel to the comb-teeth parts 32 to thereby prevent overheating of the cell 11.

The present inventors conducted a cycle test mentioned below to ascertain a changing situation of the internal pressure in the conventional cell 11. The inventors checked changes in distribution of the internal pressure caused by the progress of endurance use. This cycle test was conducted by repeating charge at high rate and discharge not at high rate.

Figure 6:
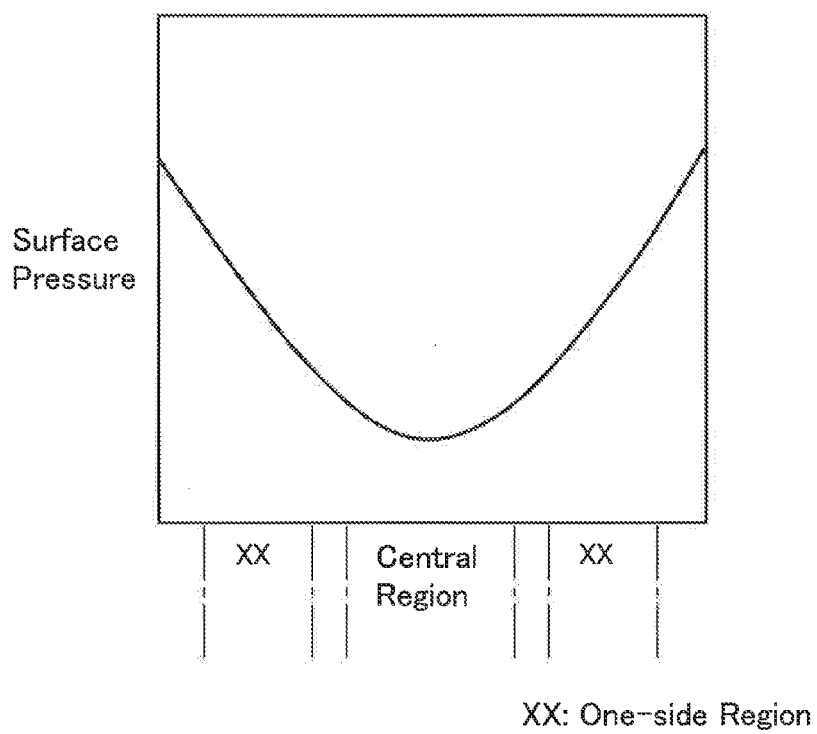
FIG. 6 is a graph showing a distribution of surface pressure after endurance use.

In FIG. 6, a middle range in horizontal axis corresponds to the central region 42 in FIG. 5. As shown in this figure, as the endurance use progresses, the surface pressure of the range corresponding to the central region 42 is decreased as compared with the range corresponding to each one-side region 41. A difference between the surface pressure on the central region 42 and the surface pressure on each one-side region 41 does not substantially appear in a new battery, but increases as the endurance use progresses. In the end portion R (see FIG. 2), the internal pressure hardly appears as surface pressure even if it is changed.

The above experiment reveals that variation in surface pressure gradually increases as charge and discharge are repeated from the initial condition of a new battery. Specifically, when the cells 11 are bound so as to keep their flat shape as in a conventional manner, the surface pressure is not maintained to be uniform.

Figure 7:
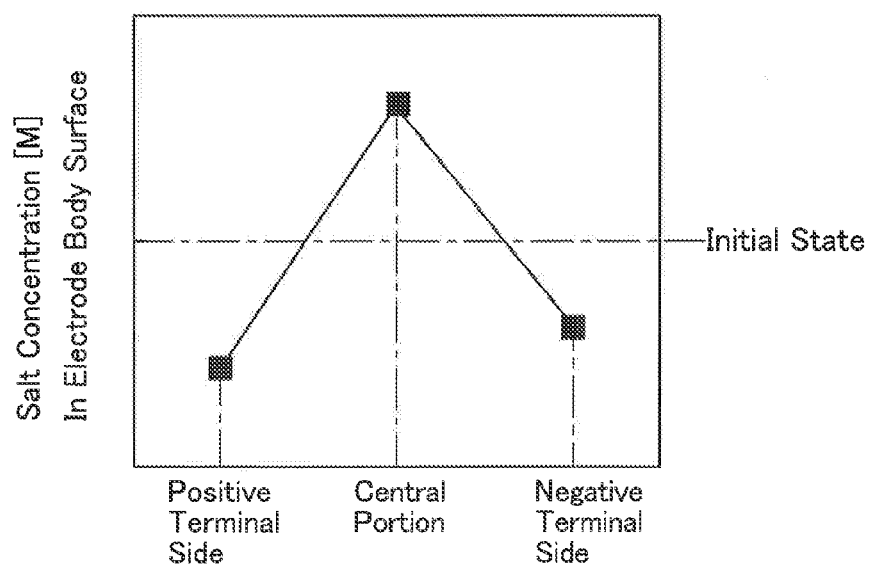
FIG. 7 is a graph showing variations in salt concentration in an electrode body surface after endurance use.

Furthermore, when the battery pack 1 is used under the condition of high-rate overcharge as in this experiment, it is found that salt concentration becomes uneven within a surface of the electrode body as the endurance use progresses. Specifically, as shown in FIG. 7, the salt concentration in portions close to the positive terminal and the negative terminal is lower than in an initial state and the salt concentration in a central portion is higher than in the initial state. This unevenness of salt concentration also causes a rise in internal resistance value of the cell 11. The inventors of the present application paid attention to that this distribution of salt concentration unevenness is similar in tendency to an inverted distribution in a high and low relation.

The present inventors further found that using of the contact member 12 of the present embodiment instead of maintaining the flat shape could suppress the variations in surface pressure. Specifically, as shown in FIG. 3, the central portion 32b of the comb-teeth part 32 is formed to have a higher protruding height than the one-side portions 32a. Accordingly, the pressing force to the central region 42 of the pressed surface 11a of the cell 11 is larger than the pressing force to the one-side regions 41. This design could suppress the variation in surface pressure after endurance use and prevent both the progression of salt concentration unevenness and the increase in internal resistance value.

In the present embodiment, the shape of the comb-teeth parts 32 of the contact member 12 is designed as shown in FIGS. 3 and 4 to make the pressing force to the pressed surface 11a of the cell 11 different by position. In other words, the top face 33 of each comb-teeth part 32 is designed to be convex at the center.

The above example is directed to the comb-teeth parts 32 shaped as shown in FIGS. 3 and 4 to impart a larger pressing force to the central region 42 than to the one-side regions 41. However, the shape of the contact member 12 is not limited to the above. The protruding height of a portion of the contact member 12 facing the central region 42 has only to be larger than that of another portion of the contact member 12 facing each one-side region 41. As an alternative, an area occupying ratio of a contact area of the contact member 12 to the pressed surface 11a may be set different between each one-side region 41 and the central region 42. This also can reduce the distribution of surface pressure. Specifically, the area occupying ratio of the portion facing the central region 42 is set to be larger than the area occupying ratio of the portions facing the one-side regions 41.

Figure 8:
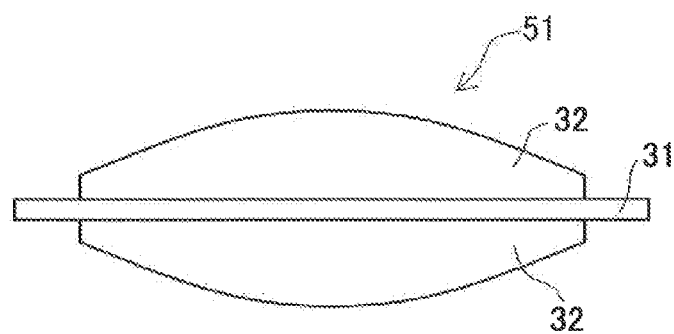
FIG. 8 is a side view showing another example of a comb-teeth shape of a contact member.

Other examples of the shape of the comb-teeth part will be explained below. For instance, a contact member 51 placed between the cells 11 may be configured such that the comb-teeth parts 32 are formed on both sides of the connecting part 31 as shown in FIG. 8. It is however preferred that a contact member to be placed between the binding member 13 and one cell 11 has the comb-teeth parts on only one side surface so that a flat side surface of the contact member is placed in contact with the binding member 13. In this case, similarly, the shape of a portion forming the comb-teeth parts may be appropriately selected from those mentioned later.

Figure 9:
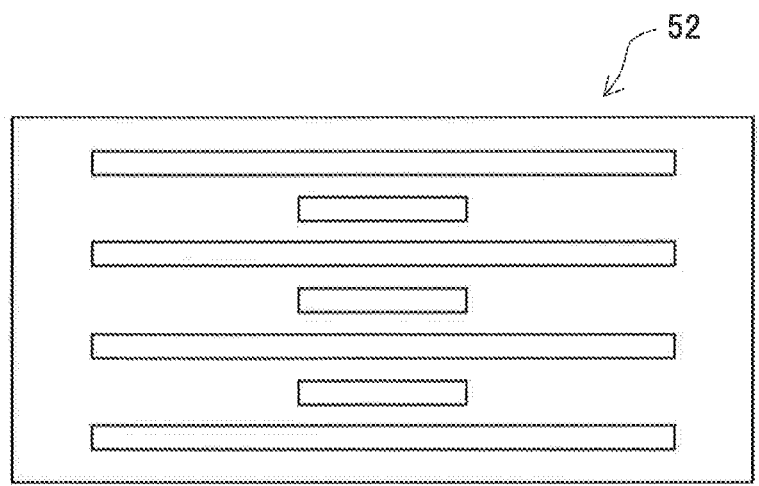
FIG. 9 is a front view showing another example of arrangement of comb teeth of a contact member.
Figure 10:
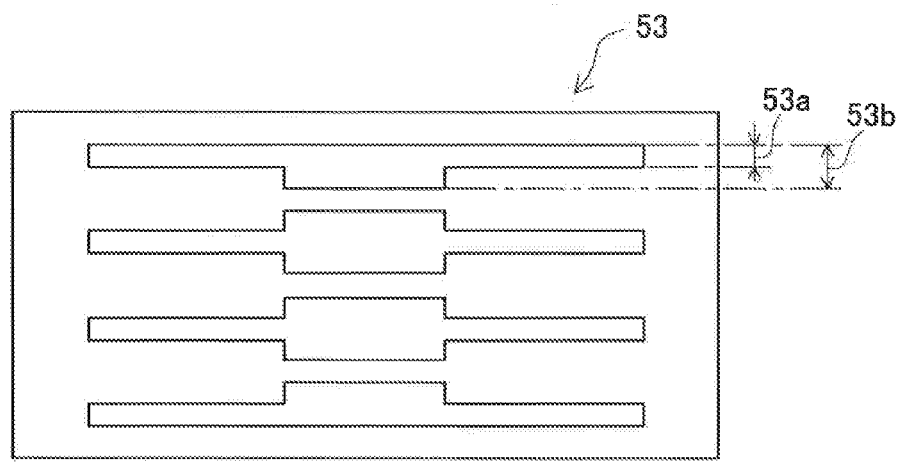
FIG. 10 is a front view showing another example of arrangement of comb teeth of a contact member.

As long comb teeth in the winding axis direction, for instance, a contact member 52 shown in FIG. 9 and a contact member 53 shown in FIG. 10 may also be adopted. The contact member 52 includes short comb teeth formed only in positions facing the central region 42 and between long comb teeth. No comb teeth are provided in positions facing the one-side regions 41 and on both sides of each short comb teeth. The contact member 53 is configured such that the width 53a of the top face of each comb teeth corresponding to each one-side region 41 is smaller than the width 53b of the top face of each comb teeth corresponding to the central region 42. In this figure, each top face has a stepped shape but may have a smoothly changing shape.

Figure 11:
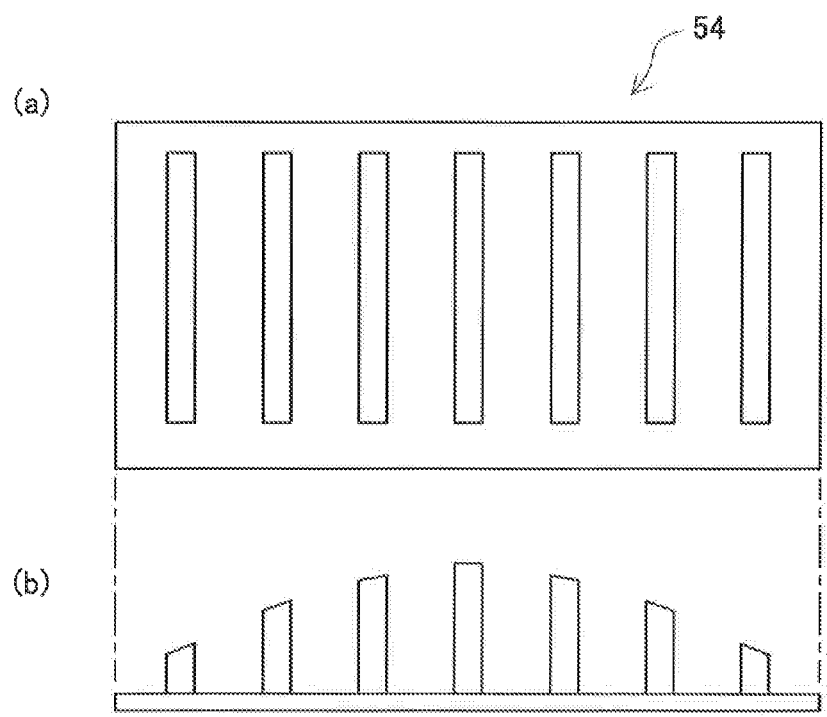
FIG. 11 is a front view and a side view showing another example of arrangement of comb teeth of a contact member.
Figure 12:
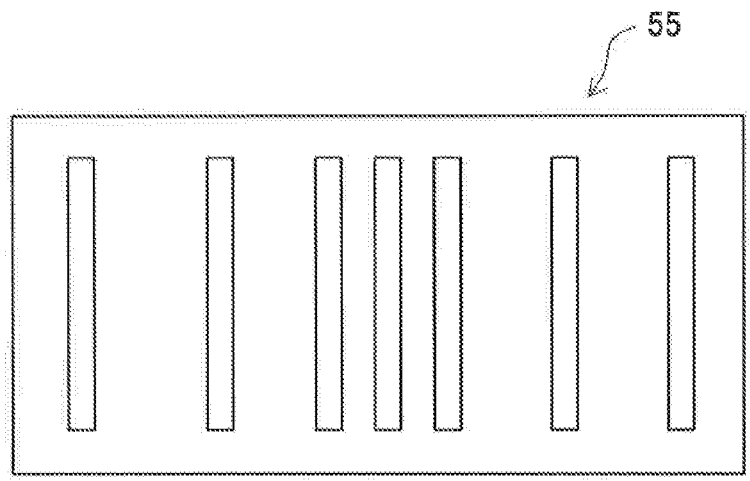
FIG. 12 is a front view showing another example of arrangement of comb teeth of a contact member.
Figure 13:
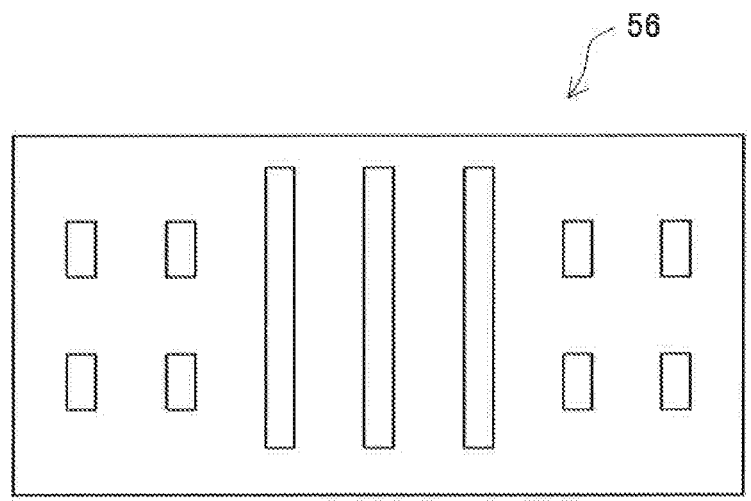
FIG. 13 is a front view showing another example of arrangement of comb teeth of a contact member.

As other alternatives, as shown in FIGS. 11 to 13, comb teeth may be designed to extend in a direction (a vertical direction in the figures) perpendicular to the winding axis of the cell 11. Those comb teeth are preferably used to make cooling air flow in the vertical direction in the figures. The comb teeth may be arranged to meet the flowing direction of the cooling air. For example, in a contact member 54 shown in FIG. 11, as illustrated in a side view (b), the comb teeth are different in protruding height by position in a lateral direction in the figure, i.e., in the winding axis direction.

As an alternative, as shown by a contact member 55 in FIG. 12, the comb teeth may be arranged at irregular intervals with wide or narrow space to produce a difference in area occupying ratio. As another alternative, as shown by a contact member 56 in FIG. 13, the comb teeth corresponding to the central region 42 and the comb teeth corresponding to the one-side regions 41 may be different in length. This figure illustrates two short comb teeth vertically arranged in each line corresponding to each one-side region 41; however, one comb tooth or three or more comb teeth may be arranged instead.

Figure 14:
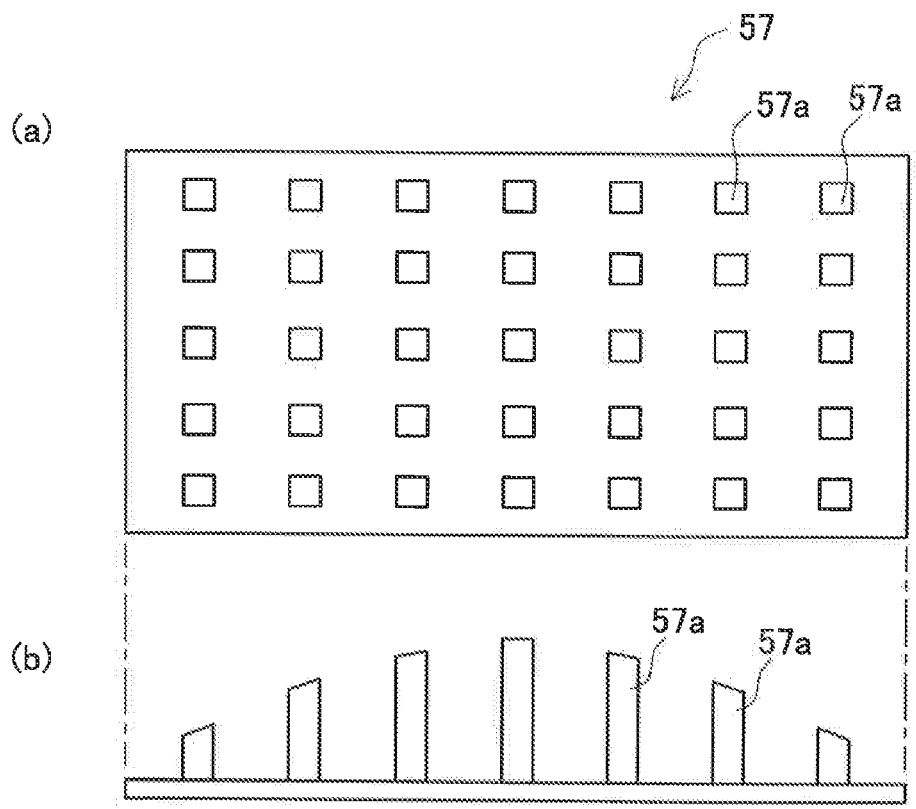
FIG. 14 is a front view and a side view showing another example of arrangement of comb teeth of a contact member.
Figure 15:
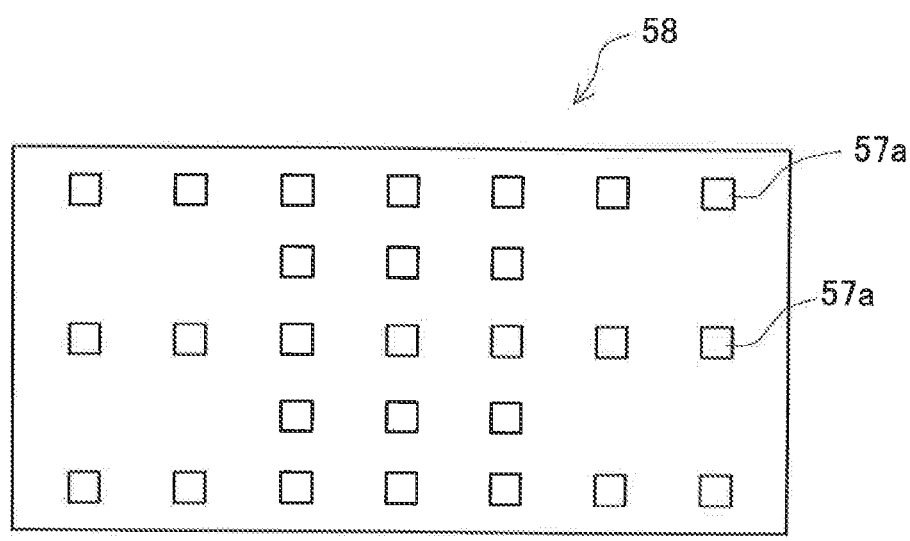
FIG. 15 is a front view showing another example of arrangement of comb teeth of a contact member.
Figure 16:
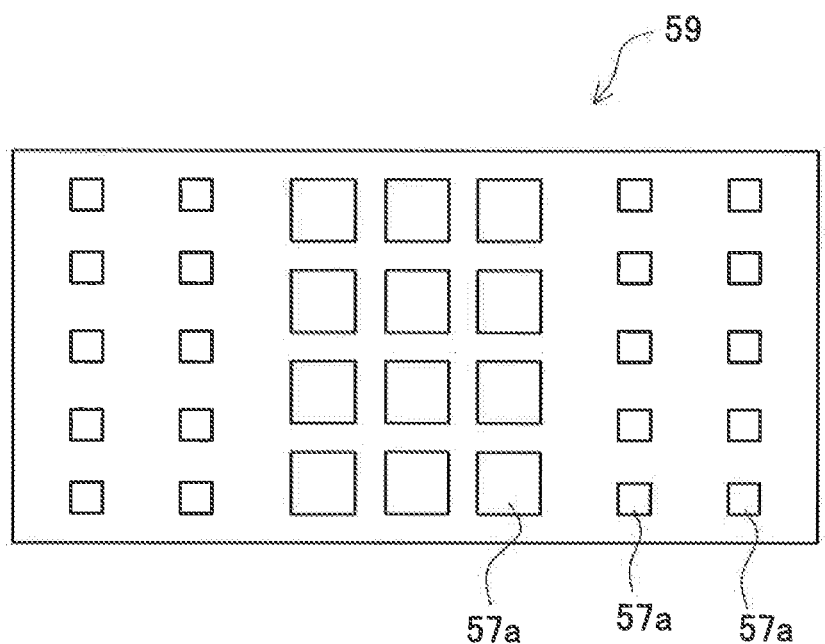
FIG. 16 is a front view showing another example of arrangement of comb teeth of a contact member.

Furthermore, as shown in FIGS. 14 to 16, contact members may be designed to have columnar-shaped protrusions. For example, as shown in FIG. 14, a contact member 57 is configured so that protrusions 57a having the same thickness are arranged in vertical and lateral rows. The thus configured contact member 57 can be used irrespective of the direction of cooling air. In this case, as shown in a side view (b) in the figure, the protrusions 57a may be formed with different protruding height by different positions in the winding axis direction. Specifically, high protrusions are arranged corresponding to the central region 42 and short protrusions are arranged corresponding to the one-side regions 41.

As an alternative, as shown by a contact member 58 in FIG. 15, protrusions may be arranged densely in correspondence to the central region 42 and sparsely in correspondence to the one-side regions 41. As another alternative, as shown in FIG. 16, a contact member 59 may also be configured such that protrusions are formed different in thickness. In this way, when the protrusions corresponding to the central region 42 are formed thick and the protrusions corresponding to the one-side regions 41 are formed thin, the area occupying ratio of the protrusions can be set different according to the regions.

According to the battery pack 1 of the present embodiment explained in detail above, the contact members 12 are placed in contact with the pressed surfaces 11a of the cells 11. On the surface of each contact member 12 on a side corresponding to the pressed surface 11a, there are formed the comb-teeth parts 32 as protruding portions extending in the winding axis direction of the cell 11 so that the height of each comb-teeth part 32 is different by position. Specifically, the protruding height is higher in correspondence to the central region 42 in the winding axis direction than in correspondence to the one-side regions 41. This can suppress deterioration in surface pressure of the central portion to make uniform the surface pressure and also prevent an increase in internal resistance value. Thus, the deterioration of the cell 11 can be restrained from progressing.

The above embodiment is a mere example and does not give any limitations to the scope of the invention. The present invention thus may be embodied in other specific forms without departing from the essential characteristics thereof. For instance, although the above embodiment exemplifies the battery pack including the plurality of cells 11 in a stacked manner, the cells are not necessarily more than one. That is, the present invention may also be applied to a secondary battery assembly configured such that a single cell 11 is held from both sides thereof by the contact members 12.

Alternatively, a surface of the connecting part 31, not formed with the comb-teeth parts, may be formed with a protrusion(s) having a length enough to contact with an end of the case 21 of the cell 11 so that a gap is produced between the contact member 12 and the cell 11. Still alternatively, the connecting part 31 may be formed in advance with a through hole in a portion other than the comb-teeth parts. With this design, the gap or the through hole allows the cell 11 on the back side of the comb-teeth parts to be subjected to cooling air.

The present invention is widely applicable not only to the lithium ion secondary batteries but also to secondary batteries of non-aqueous electrolyte type. Furthermore, the present invention is applicable not only to a battery using a can case but also to a battery using a laminated case as long as it is pressed in use.

REFERENCE SIGNS LIST

1 Battery pack
11 Cell
11a Pressed surface
12, 51, 52, 53, 54, 55, 56, 57, 58, 59 Contact member
13 Binding member
21 Case
23 Electrode body
31 Connecting part
32 Comb-teeth part
41 One-side region
42 Central region

The invention claimed is:
1. A secondary battery assembly including: a secondary battery including a wound electrode body enclosed in a flat rectangular case; a contact member partly contacting a side surface of the secondary battery, the side surface having a maximum area (hereinafter, referred to as "pressed surface") of outer surfaces of the secondary battery; and a binding member for binding the secondary battery and the contact member, the binding member being configured to bind the contact member to partly press against the pressed surface,
wherein the contact member includes:
a plurality of contact parts arranged discretely, each contact part being in contact with the pressed surface; and
a connecting part connecting the plurality of contact parts to one another,
the contact parts are formed
to protrude from the connecting part toward the pressed surface, and
into an arrangement or a shape to press more weakly both one-side regions of the pressed surface corresponding to portions off a center of the wound electrode body in a winding axis direction, and to press more strongly a central region of the pressed surface between the one-side regions, the central region corresponding to a portion close to the center of the wound electrode body in the winding axis direction,
wherein an area occupying ratio of the contact parts in correspondence to each of the one-side regions is smaller than an area occupying ratio of the contact parts in correspondence to the central region, the area occupying ratio of the contact parts in correspondence to each of the one-side regions being defined as a ratio of an area of the contact parts in each of the one-side regions to a total area of each of the one-side regions, and the area occupying ratio of the contact parts in correspondence to the central region being defined as a ratio of an area of the contact parts in the central region to a total area of the central region.

2. The secondary battery assembly according to claim 1, wherein the contact parts include a contact part formed to be long in a direction perpendicular to the winding axis direction of the wound electrode body.

3. The secondary battery assembly according to claim 2, wherein the contact part located corresponding to each one-side region is formed to be shorter than the contact part located corresponding to the central region.

4. The secondary battery assembly according to claim 2, wherein the contact parts located corresponding to the one-side regions are arranged at wider intervals than the contact parts located corresponding to the central region.

5. The secondary battery assembly according to claim 1, wherein the contact parts include a contact part protruding in a columnar shape.

6. The secondary battery assembly according to claim 5, wherein the contact parts located corresponding to the one-side regions are arranged at wider intervals than the contact parts located corresponding to the central region.

7. The secondary battery assembly according to claim 1,
wherein the contact parts include a contact part formed to extend continuously over the one-side regions located on both sides in the winding axis direction of the wound electrode body, and
wherein the contact parts include a contact part formed such that a thickness in a direction perpendicular to the winding axis direction of the wound electrode body is thinner in correspondence to the one-side regions than in correspondence to the central region.

8. The secondary battery assembly according to claim 7, wherein the contact parts include a contact part formed to be long in a direction perpendicular to the winding axis direction of the wound electrode body.

9. The secondary battery assembly according to claim 8, wherein the contact part located corresponding to each one-side region is formed to be shorter than the contact part located corresponding to the central region.

10. The secondary battery assembly according to claim 8, wherein the contact parts located corresponding to the one-side regions are arranged at wider intervals than the contact parts located corresponding to the central region.

11. The secondary battery assembly according to claim 7, wherein the contact parts include a contact part protruding in a columnar shape.

* * * * *